United States Patent
Hofer et al.

(10) Patent No.: US 11,884,182 B2
(45) Date of Patent: Jan. 30, 2024

(54) ELECTRIC-VEHICLE BATTERY SYSTEM INCLUDING A REAL TIME CLOCK

(71) Applicant: SAMSUNG SDI CO., LTD., Yongin-si (KR)

(72) Inventors: Maximilian Hofer, Yongin-si (KR); Christoph Schmiedhofer, Yongin-si (KR); Thomas Trathnigg, Yongin-si (KR); Kurt Duller, Yongin-si (KR); Renato Mandic, Yongin-si (KR); Damir Kovac, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 155 days.

(21) Appl. No.: 17/190,627

(22) Filed: Mar. 3, 2021

(65) Prior Publication Data

US 2021/0300207 A1    Sep. 30, 2021

(30) Foreign Application Priority Data

Mar. 31, 2020   (EP) ................................... 20167179
Oct. 13, 2020   (KR) ..................... 10-2020-0131928

(51) Int. Cl.
*H02J 7/00*       (2006.01)
*B60L 58/16*    (2019.01)
*G04G 19/00*   (2006.01)

(52) U.S. Cl.
CPC .............. *B60L 58/16* (2019.02); *G04G 19/00* (2013.01); *H02J 7/0013* (2013.01); *H02J 7/00032* (2020.01)

(58) Field of Classification Search
CPC .......... B60L 53/50; B60L 53/62; B60L 50/60; B60L 58/12; H02J 7/00032; H02J 7/0071; H02J 7/04; H02J 2207/20
USPC .............................................. 320/109; 701/22
See application file for complete search history.

(56) References Cited

U.S. PATENT DOCUMENTS

| | | | |
|---|---|---|---|
| 2005/0007072 A1* | 1/2005 | Krieger | H02J 7/0071 320/131 |
| 2008/0097664 A1* | 4/2008 | Aoyama | H02J 7/1438 701/36 |
| 2011/0241623 A1 | 10/2011 | Wade et al. | |
| 2011/0301795 A1* | 12/2011 | Failing | H02J 50/12 701/45 |
| 2011/0309680 A1 | 12/2011 | Oleksiewicz | |

(Continued)

FOREIGN PATENT DOCUMENTS

| | | | | |
|---|---|---|---|---|
| WO | WO 2011/126909 A2 | 10/2011 | | |
| WO | WO-2020067773 A1 * | 4/2020 | ............ | B60L 3/0015 |

OTHER PUBLICATIONS

EP 20167179.9 Extended European Search Report, dated Oct. 7, 2020.

*Primary Examiner* — Zixuan Zhou
(74) *Attorney, Agent, or Firm* — Lee IP Law, P.C.

(57) ABSTRACT

An electric-vehicle battery system includes a high voltage system with a plurality of connected rechargeable battery cells; a low voltage system with an operating voltage lower than an operating voltage of the high voltage system, the low voltage system supplying a battery system manager; and a real time clock configured to provide a system time to the battery system manager. The real time clock may be at least temporarily powered by the high voltage system.

14 Claims, 1 Drawing Sheet

(56) References Cited

U.S. PATENT DOCUMENTS

2017/0361791 A1  12/2017  Yoon et al.
2018/0186241 A1* 7/2018  Harvey .................. B60L 53/14

* cited by examiner

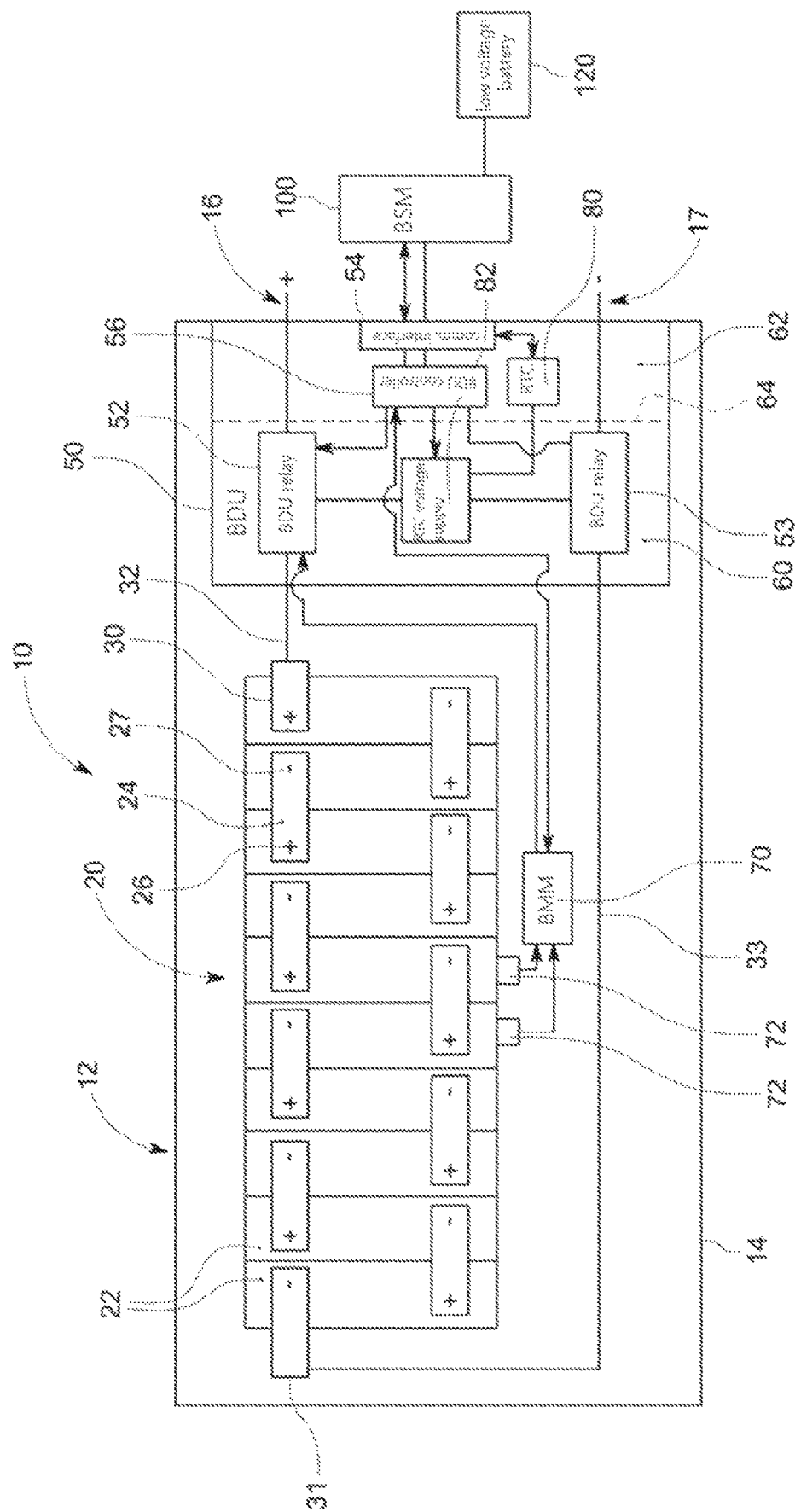

ELECTRIC-VEHICLE BATTERY SYSTEM INCLUDING A REAL TIME CLOCK

CROSS-REFERENCE TO RELATED APPLICATION

European Patent Application No. 20167179.9, filed on Mar. 31, 2020, in the European Intellectual Property Office, and entitled: "Electric Vehicle Battery System Comprising a Real Time Clock," and Korean Patent Application No. 10-2020-0131928, filed on Oct. 13, 2020, in the Korean Intellectual Property Office, are incorporated by reference herein in their entirety.

BACKGROUND

1. Field

Embodiments relate to an electric-vehicle battery system including a real time clock.

2. Description of the Related Art

Vehicles for transportation of goods and people have been developed using electric power as a source for motion. Such an electric vehicle is an automobile that is propelled by an electric motor, using energy stored in rechargeable batteries. An electric vehicle may be solely powered by batteries or may be a form of hybrid vehicle powered by for example a gasoline generator. Furthermore, the vehicle may include a combination of electric motor and a combustion engine. In general, an electric-vehicle battery, EVB, or traction battery is a battery used to power the propulsion of battery electric vehicles, BEVs. Electric-vehicle batteries differ from starting, lighting, and ignition batteries because they are designed to give power over sustained periods of time. A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g., cylindrical or rectangular, depends on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of a plurality of unit battery cells coupled in series and/or in parallel so as to provide a high energy density, for example for motor driving of a hybrid vehicle. That is, the battery module is formed by interconnecting the electrode terminals of the plurality of unit battery cells depending on a desired amount of power and in order to realize a high-power rechargeable battery.

Battery modules can be constructed either in block design or in modular design. In block designs each battery is coupled to a common current collector structure and a common battery management system and the unit thereof is arranged in a housing. In modular designs, pluralities of battery cells are connected to form submodules and several submodules are connected to form the battery module. In automotive applications, battery systems often consist of a plurality of battery modules connected in series for providing a desired voltage. Therein, the battery modules may include submodules with a plurality of stacked battery cells, each stack including cells connected in parallel that are connected in series (XpYs) or multiple cells connected in series that are connected in parallel (XsYp).

A battery pack is a set of any number of (preferably identical) battery modules. They may be configured in a series, parallel or a mixture of both to deliver the desired voltage, capacity, or power density. Components of battery packs include the individual battery modules, and the interconnects, which provide electrical conductivity between them.

SUMMARY

Embodiments are directed to an electric-vehicle battery system, including: a high voltage system with a plurality of connected rechargeable battery cells; a low voltage system with an operating voltage lower than an operating voltage of the high voltage system, the low voltage system supplying a battery system manager; and a real time clock configured to provide a system time to the battery system manager. The real time clock may be at least temporarily powered by the high voltage system.

The electric-vehicle battery system may further include a battery disconnect, the battery disconnect including: battery disconnect relays to switchably open or close a high-voltage line of the high voltage system; and a battery disconnect controller adapted to control the battery disconnect relays. The battery disconnect may be adapted to exchange data with the battery system manager via a communication interface. The real time clock may be integrated into the battery disconnect.

The battery disconnect may include: a high voltage section including the battery disconnect relays; and a low voltage section including the battery disconnect controller. The real time clock may be arranged on the low voltage section of the battery disconnect.

The low voltage section and the high voltage section may be separated from each other by galvanic isolation.

The battery disconnect may include a real time clock voltage supply configured to receive an input voltage from the high voltage system and to provide a supply voltage at an output of the real time clock voltage supply. The real time clock may be electrically connected to and configured to draw power from the output of the real time clock voltage supply.

The battery disconnect controller may be configured to operate the real time clock voltage supply such that the real time clock voltage supply is inactive in a first operation state of the battery system and active in a second operation state of the battery system.

The real time clock may be further configured to receive a supply voltage from the low voltage system and the real time clock. The real time clock may be powered by the low voltage system in the first operation state of the battery system and powered by the high voltage system in the second operation state of the battery system.

The real time clock voltage supply may include a voltage divider configured to convert the input voltage from the high voltage system into the supply voltage.

The real time clock may be located in the low voltage system.

Embodiments are also directed to an electric vehicle including an electric-vehicle battery system, wherein the electric-vehicle battery system includes: a high voltage system with a plurality of connected rechargeable battery cells; a low voltage system with an operating voltage lower than an operating voltage of the high voltage system, the low voltage system supplying a battery system manager; and a real time clock configured to provide a system time to the battery system manager. The real time clock may be at least temporarily powered by the high voltage system.

The electric vehicle may further include a battery disconnect, the battery disconnect including: battery disconnect relays to switchably open or close a high-voltage line of the high voltage system; and a battery disconnect controller adapted to control the battery disconnect relays. The battery disconnect may be adapted to exchange data with the battery system manager via a communication interface. The real time clock may be integrated into the battery disconnect.

The battery disconnect may include: a high voltage section including the battery disconnect relays, and a low voltage section including the battery disconnect controller. The real time clock may be arranged on the low voltage section of the battery disconnect.

The low voltage section and the high voltage section may be separated from each other by galvanic isolation.

The battery disconnect may include a real time clock voltage supply configured to receive an input voltage from the high voltage system and to provide a supply voltage at an output of the real time clock voltage supply. The real time clock may be electrically connected to and configured to draw power from the output of the real time clock voltage supply.

The battery disconnect controller may be configured to operate the real time clock voltage supply such that the real time clock voltage supply is inactive in a first operation state of the battery system and active in a second operation state of the battery system.

The real time clock may be further configured to receive a supply voltage from the low voltage system and the real time clock. The real time clock may be powered by the low voltage system in the first operation state of the battery system and powered by the high voltage system in the second operation state of the battery system.

The real time clock voltage supply may include a voltage divider configured to convert the input voltage from the high voltage system into the supply voltage.

The real time clock may be located in the low voltage system.

BRIEF DESCRIPTION OF THE DRAWING

Features will become apparent to those of skill in the art by describing in detail example embodiments with reference to the attached drawing in which:

The FIGURE schematically illustrates a battery system according to an example embodiment.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey example implementations to those skilled in the art.

In the drawing FIGURE, the dimensions of layers and regions may be exaggerated for clarity of illustration. Like reference numerals refer to like elements throughout.

In the following description, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

The FIGURE schematically illustrates a battery system according to an example embodiment.

The FIGURE is a top view illustrating an electric-vehicle battery system 10 according to an example embodiment; for readability, the electric-vehicle battery system 10 may be referred to as the battery system 10. The FIGURE illustrates electrical connections between a battery module 20, a battery disconnect (BDU) 50, and a battery system manager (BSM) 100 of the battery system 10. The battery system 10 may be utilized in an electric vehicle.

In the present example embodiment, the battery system 10 includes a battery pack 12 including a housing 14. The housing 14 may be assembled from several parts, such as a bottom plate including the lateral walls and a top cover and shell. The housing 14 serves to accommodate the individual components of the battery pack 12. These components may include parts of a cooling system, sensors to detect the temperature and other operating conditions of the battery pack 12, at least one battery module 20, and control units for controlling the operating conditions of the battery pack 12. Additional components may be included in the battery pack 12.

In the present example embodiment, the battery system 10 includes a high voltage system (HV system) and a low voltage system (LV system). In the HV system there is a voltage that is higher than the voltage in the LV system. The HV system may include, e.g., the battery module 20 as a voltage source and all conductive components of the battery pack 12 connected to the battery module 20 up to the positive and negative battery system terminals 16, 17. An electric motor for propulsion of the electric vehicle including the battery pack 12 connects to the battery system terminals 16, 17.

In the present example embodiment, the HV system includes the battery module 20 as high voltage source. Referring to the FIGURE, in an example embodiment the battery module 20 may include a plurality of battery cells 22, e.g., ten aligned battery cells 22, which may be stacked in a stacking direction with their wide side surfaces facing each other. The battery cells 22 of the battery module 20 may be connected to each other via busbars 24 in serial configuration, such that each busbar 24 connects one positive cell terminal 26 and one negative cell terminal 27 to each other and the plurality of battery cells 22 are interconnected by means of the respective busbars 24 between negative and positive module terminals 30 and 31. The battery pack 12 may include a plurality of battery modules, but for purpose of illustration the present example embodiment shows only one battery module 20.

The battery module 20 may be connected to the BDU 50 via high-voltage lines 32, 33. Each battery module 20 may further include a battery module manager (BMM) 70 for obtaining and processing relevant information such as cell voltages (voltage measurement means not shown) and cell temperatures (measured for example via temperature sensors 72) of the battery cells 22. The BMM 70 may also allow balancing charge of the single battery cells 22 of the battery module 20.

In case of an abnormal operation state, the battery pack 12 may be disconnected from a load connected to the battery system terminals 16, 17. For example, the battery system 10 may include the battery disconnect (BDU) 50 that is electrically connected between the battery module 20 and battery system terminals 16, 17. The BDU 50 may be the primary interface between the battery pack 12 and the electrical system of the vehicle. The BDU 50 may include battery disconnect relays (BDU relays) 52, 53 such as electromechanical switches that open or close the high current paths between the battery pack 12 and the electrical system. Such electrochemical switches may include solid-state relays, SSRs. Thus, the high-voltage lines 32, 33 of the battery module 20 are switchable connected with the battery system terminals 16, 17 via the BDU relays 52, 53. The BDU 50 may include further safety circuits and electronic components like fuses.

In the present example embodiment, a battery disconnect controller (BDU controller) 56 is connected via low current lines with the BDU relays 52, 53 so as to allow switching of the BDU relays 52, 53. The BDU controller 56 may also be connected with the BMM 70 via a low current line. In addition, the BDU 50 may include a communication interface 54 (e.g., serial peripheral interface, SPI) for synchronous communication between the BDU controller 56 and the BSM 100.

The BDU 50 may provide feedback to the BMM 70 of the battery module 20, such as voltage and current measurements. The BMM 70 may control the electrochemical switches in the BDU 50 via the BDU controller 56. The functions of the BDU 50 may thus include controlling current flow between the battery pack 12 and the electrical system, and current sensing.

The BDU 50 may further manage additional functions like external charging and pre-charging, which may be initiated by the BSM 100. For example, the BDU controller 56 may be configured to receive a signal indicative of a malfunction of the battery system 10 and/or indicating that the battery module 20 is to be disconnected from a load. In response to receiving such signal, the BDU controller 56 may be further configured to control the BDU relays 52, 53 to disconnect the battery module 20 from the respective battery system terminals 16, 17 (and thus a downstream load). Thus, the BDU 50 may be electrically connected to and adapted to selectively close the electric path between the module terminals 30, 31 and the battery system terminals 16, 17, and may be adapted to exchange data via the communication interface 54 with the BSM 100. For example, in case the BSM 100 determines the presence of an abnormal condition in the battery system 10, the BSM 100 may perform or control to perform at least one countermeasure associated with the determined abnormal condition, e.g., transmitting a warning signal to the vehicle's driver. The BSM 100 may transmit a disconnect signal to the BDU controller 56 that, in response to receiving the disconnect signal, controls the BDU relays 52, 53 to disconnect the battery system terminals 16, 17 from the module terminals 30, 31, respectively.

The LV system may be used to supply power to connected low-voltage consumer components, which include among others control units of the electric vehicle such as the BSM 100 as well as the BDU controller 56. The LV system may further include signal lines or other low-voltage wiring of the battery system 10. The LV system may include a low-voltage battery 120 of the electric vehicle as a voltage source and may be a part of the on-board power supply.

The BDU components of the HV system may be provided in a HV section 60 of the BDU 50, whereas the BDU components of the LV system may be provided in an LV section 62. The HV section 60 and the LV section 62 may be divided by galvanic isolation, which is indicated in the FIGURE by a dotted line 64. In the present example embodiment, the communication interface 54 and the BDU controller 56 are part of the LV section 62.

Various control and communication processes regarding the BSM 100, its constituents, or the electric consumers may be time dependent processes. For example, monitoring and controlling the charging of battery cells 22 may involve the determination of the rate of change of the state of charge. Further, in idle periods of the electric consumers, i.e., in periods of minimal load, various parameters, e.g., battery voltages and internal resistances, may be periodically controlled during wake up periods to avoid a system failure, e.g., due to a thermal runaway or short circuits of individual battery cells 22. In the present example embodiment, a real time clock (RTC) 80 is provided to provide a time scale for, e.g., the wake up function of the control electronics, the BSM 100 of the battery system 10, etc.

In the present example embodiment, the RTC 80 is provided on the LV section 62 of the BDU 50. The RTC 80 may transmit a time signal via the communication interface 54 to the BSM 100, i.e., the RTC 80 may provide a system time to the BSM 100. The RTC 80 may be an integrated circuit providing the functionality of a common RTC. Thus, the RTC 80 may be integrated into the BDU 50, wherein the RTC 80 is arranged on the LV section 62 of the BDU 50. The RTC 80 may provide the system time to the BSM 100 via the communication interface 54 of the BDU 50.

The BDU 50 may be adapted such that the RTC 80 is at least temporarily powered by the HV system. For example, the BDU 50 may include a real time clock voltage supply (RTC voltage supply) 82 configured to receive an input voltage from the HV system and provide a supply voltage at an output of the RTC voltage supply 82. The RTC 80 may be electrically connected to and configured to draw power from the output of the RTC voltage supply 82. Thus, a secure power supply of the RTC 80 during all operational states of the battery system 10 may be ensured.

In an example embodiment, the BDU controller 56 may be configured to operate the RTC voltage supply 82 such that the RTC voltage supply 82 is inactive in a first operation state of the battery system 10 and active in a second operation state of the battery system 10. The RTC 80 may be further configured to receive a supply voltage from the LV system and the RTC 80, and the RTC 80 may be powered by the LV system in the first operation state of the battery system 10 and powered by the HV system in the second operation state of the battery system 10. The RTC voltage supply 82 may include a voltage divider configured to convert the input voltage from the HV system into the supply voltage.

The RTC voltage supply 82 may be configured to be inactive in a first operation state of the battery system 10 and active in a second operation state of the battery system 10. The second operation state of the battery system 10 may be an idle or sleep mode of the battery system 10, whereas the first operation state may be an active state of the battery system 10. The active state of the battery system 10 may occur during charging or while providing power to a load.

In the active state, the LV system provides the supply voltage for the RTC 80, and the RTC 80 is enabled to draw power via, e.g., the BSM 100 in the first operation state.

In the second operation state, the RTC 80 may draw power from the HV system via the RTC voltage supply 82.

Thus, power demand of the RTC 80 may be met in both operation states even without active switching in the power supply circuit of the RTC 80. The RTC 80 may provide a continuous system time to the BSM 100 when the battery system 10 returns to the first operation state.

In order to adapt the input voltage of the HV system to supply voltage, which is of a lower value as per the power requirements of the RTC 80, the RTC voltage supply 82 may include a voltage divider (not shown in FIGURES). The voltage divider may be configured to convert the voltage from the module terminals 30, 31 into the supply voltage of the RTC 80. For example, passive elements may be used to convert the voltage of the module terminals 30, 31 that is provided as the input voltage of the RTC voltage supply 82. For example, ohmic resistances and/or diodes may be used to lower the input voltage from the battery module 20. Due to the small currents drawn by the RTC 80, the power losses over such passive elements may be minimal.

As described above, in an example embodiment the RTC 80 draws power from the LV system of the battery system 10 in the first operation state and draws power from the HV system via the RTC voltage supply 82 during the second operation state, such that the power demand of the RTC 80 can be met in both operation states.

By way of summation and review, to meet the dynamic power demands of various electrical consumers connected to a battery system, static control of battery power output and charging may not be sufficient. Thus, steady exchange of information between the battery system and the controllers of the electrical consumers may be implemented. This information may include the battery system's actual state of charge, SoC, potential electrical performance, charging ability, and internal resistance, as well as actual or predicted power demands or surpluses of the consumers. Therefore, battery systems may include a battery system manager (BSM) for obtaining and processing such information on system level and may further include a plurality of battery module managers (BMMs), which are part of the system's battery modules and obtain and process relevant information on system level. The BSM may measure the system voltage, the system current, the local temperature at different places inside the system housing, and the insulation resistance between live components and the system housing. Additionally, the BMMs may measure individual the cell voltages and the temperatures of the battery modules.

In case of an abnormal operation state, a battery pack may be disconnected from a load connected to a terminal of the battery pack. The battery system may further include a battery disconnect (BDU) that is electrically connected between the battery module and battery system terminals. The BDU may serve as an interface between the battery pack and the electrical system of the vehicle. The BDU may include, e.g., electromechanical switches that open or close high current paths between the battery pack and the electrical system. The BDU may provide feedback to a battery control unit (BCU) of the battery modules, such as voltage and current measurements. The BCU may control the switches in the BDU using low current paths based on the feedback received from the BDU. The BDU may thus control current flow between the battery pack and the electrical system, and perform current sensing. The BDU may further manage additional functions like external charging and pre-charging.

Various control and communication processes regarding the BSM, its constituents, or the electric consumers may be time-dependent processes. Monitoring and controlling the charging of battery cells may involve, e.g., the determination of the rate of change of the state of charge. Further, in idle periods of the electric consumers, i.e., in periods of minimal load, various parameters, e.g., battery voltages and internal resistances, may be periodically controlled during wake up periods to avoid a system failure, e.g., due to a thermal runaway or short circuits of individual cells. In order to provide a time scale, e.g., for the wake up, the control electronics or BSM of the battery system may include a real time clock (RTC).

The RTC may be provided as an integrated circuit (IC), and may include, e.g., a crystal oscillator or may use a power line frequency for deriving a time scale. Continuous energy may be supplied to the RTC in order to keep track of running time. The RTC may include a volatile or non-volatile memory in order to store time-related information such as calendar date. To ensure operation, an alternate power source, e.g., a lithium button cell battery or a capacitor, may be provided additionally to a primary power source.

In a general battery system, a 12V/24V board net may be used to supply power to the RTC. However, a loss of this 12V/24V domain may result in a loss of the time. A low-dropout regulator (LDO) may be used for supplying the RTC since, e.g., a 12V domain may have a very wide input range, starting from low volt (approximately about 3V) up to load dump voltage of more than 30V. In general, an LDO is an active linear voltage regulator that dissipates power in order to regulate the output voltage, and the power consumption of an LDO may be high. This power consumption may be undesirable with respect to the extended idle times of electric vehicles. Further, the cost of a commercial LDO may be high.

As described above, embodiments may provide an alternative power supply for the RTC of a battery system, which may decrease the power consumption of the battery system, for example during idle periods, while providing a secure power supply of the RTC during all operational states of the battery system and/or the RTC. Further, production costs of the battery system may be decreased.

The electronic or electric devices and/or any other relevant devices or components according to embodiments described herein may be implemented utilizing suitable hardware, firmware (e.g., an application-specific integrated circuit), software, or a combination of software, firmware, and hardware. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g., on a PCB or another kind of circuit carrier. The conducting elements may include metallization, e.g., surface metallizations and/or pins, and/or may include conductive polymers or ceramics. Further, electrical energy might be transmitted via wireless connections, e.g., using electromagnetic radiation and/or light.

Further, the various components of these devices may be a process or thread, running on one or more processors, in one or more computing devices, executing computer program instructions and interacting with other system components for performing the various functionalities described herein. The computer program instructions may be stored in a memory that may be implemented in a computing device using a standard memory device, such as, e.g., a random access memory (RAM). The computer program instructions may also be stored in other non-transitory computer readable media such as, e.g., a CD-ROM, flash drive, or the like.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electric-vehicle battery system, comprising:
   a high voltage system with a plurality of connected rechargeable battery cells;
   a low voltage system powered by a low voltage power supply separately from the rechargeable battery cells of the high voltage system with an operating voltage lower than an operating voltage of the high voltage system, the low voltage system supplying a battery system manager;
   a battery disconnect unit, including:
      a high voltage section including at least one battery disconnect relay; and
      a low voltage section including a battery disconnect controller, and
   a real time clock, configured to provide a system time to the battery system manager, arranged on the low voltage section of the battery disconnect unit, and at least temporarily powered by the high voltage system.

2. The electric-vehicle battery system as claimed in claim 1, wherein:
   the at least one battery disconnect relay switchably opens or closes a high-voltage line of the high voltage system,
   the battery disconnect controller is adapted to control the battery disconnect relays,
   the battery disconnect unit is adapted to exchange data with the battery system manager via a communication interface, and
   the real time clock is integrated into the battery disconnect unit.

3. The electric-vehicle battery system as claimed in claim 2, wherein the low voltage section and the high voltage section are separated from each other by galvanic isolation.

4. The electric-vehicle battery system as claimed in claim 2, wherein:
   the battery disconnect unit includes the real time clock voltage supply configured to receive an input voltage from the high voltage system and to provide a supply voltage at an output of the real time clock voltage supply, and
   the real time clock is electrically connected to and configured to draw power from the output of the real time clock voltage supply.

5. The electric-vehicle battery system as claimed in claim 4, wherein the battery disconnect controller is configured to operate the real time clock voltage supply such that the real time clock voltage supply is inactive in a first operation state of the battery system and active in a second operation state of the battery system.

6. The electric-vehicle battery system as claimed in claim 5, wherein the real time clock is further configured to receive a supply voltage from the low voltage system and the real time clock, and
   wherein the real time clock is powered by the low voltage system in the first operation state of the battery system and powered by the high voltage system in the second operation state of the battery system.

7. The electric-vehicle battery system as claimed in claim 4, wherein the real time clock voltage supply includes a voltage divider configured to convert the input voltage from the high voltage system into the supply voltage.

8. An electric vehicle comprising an electric-vehicle battery system, wherein the electric-vehicle battery system includes:
   a high voltage system with a plurality of connected rechargeable battery cells;
   a low voltage system powered by a low voltage power supply separately from the rechargeable battery cells of the high voltage system with an operating voltage lower than an operating voltage of the high voltage system, the low voltage system supplying a battery system manager;
   a battery disconnect unit, including:
      a high voltage section including at least one battery disconnect relay; and
      a low voltage section including a battery disconnect controller, and
   a real time clock, configured to provide a system time to the battery system manager, arranged on the low voltage section of the battery disconnect unit, and at least temporarily powered by the high voltage system.

9. The electric vehicle as claimed in claim 8, wherein:
   the at least one battery disconnect relay switchably opens or closes a high-voltage line of the high voltage system,
   the battery disconnect controller is adapted to control the battery disconnect relays,
   the battery disconnect unit is adapted to exchange data with the battery system manager via a communication interface, and
   the real time clock is integrated into the battery disconnect unit.

10. The electric vehicle as claimed in claim 9, wherein the low voltage section and the high voltage section are separated from each other by galvanic isolation.

11. The electric vehicle as claimed in claim 9, wherein the battery disconnect unit includes the real time clock voltage supply configured to receive an input voltage from the high voltage system and to provide a supply voltage at an output of the real time clock voltage supply, and wherein the real time clock is electrically connected to and configured to draw power from the output of the real time clock voltage supply.

12. The electric vehicle as claimed in claim 11, wherein the battery disconnect controller is configured to operate the real time clock voltage supply such that the real time clock voltage supply is inactive in a first operation state of the battery system and active in a second operation state of the battery system.

13. The electric vehicle as claimed in claim 12, wherein the real time clock is further configured to receive a supply voltage from the low voltage system and the real time clock, and wherein the real time clock is powered by the low voltage system in the first operation state of the battery system and powered by the high voltage system in the second operation state of the battery system.

14. The electric vehicle as claimed in claim 11, wherein the real time clock voltage supply includes a voltage divider configured to convert the input voltage from the high voltage system into the supply voltage.

\* \* \* \* \*